United States Patent
Djavaherian

(10) Patent No.: US 9,977,502 B2
(45) Date of Patent: May 22, 2018

(54) PROVIDING NON-VISUAL FEEDBACK FOR NON-PHYSICAL CONTROLS

(71) Applicant: Apple Inc., Cupertino, CA (US)

(72) Inventor: Amir C. Djavaherian, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 15/187,610

(22) Filed: Jun. 20, 2016

(65) Prior Publication Data
US 2016/0363999 A1    Dec. 15, 2016

Related U.S. Application Data

(63) Continuation of application No. 12/791,447, filed on Jun. 1, 2010, now Pat. No. 9,372,537.

(51) Int. Cl.
| | | |
|---|---|---|
| *G06F 3/01* | (2006.01) | |
| *G06F 3/041* | (2006.01) | |
| *G06F 3/0488* | (2013.01) | |
| *G06F 3/0481* | (2013.01) | |

(52) U.S. Cl.
CPC .............. *G06F 3/016* (2013.01); *G06F 3/041* (2013.01); *G06F 3/0481* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 6,075,515 A | * | 6/2000 | Keyson ............... G06F 3/016 345/156 |
| 8,334,840 B2 | | 12/2012 | Serafin et al. |
| 2009/0040318 A1 | | 2/2009 | Brosnan et al. |
| 2009/0219252 A1 | * | 9/2009 | Jarventie ............ G06F 3/04886 345/173 |
| 2009/0225043 A1 | | 9/2009 | Rosener |
| 2009/0273571 A1 | * | 11/2009 | Bowens .............. G06F 3/03547 345/173 |
| 2010/0222049 A1 | | 9/2010 | Kim |
| 2011/0110553 A1 | | 5/2011 | Logan |
| 2011/0175803 A1 | * | 7/2011 | Serafin ................. B60K 37/06 345/156 |
| 2011/0248916 A1 | | 10/2011 | Griffin et al. |

OTHER PUBLICATIONS

Office Action, dated Feb. 7, 2013, received in U.S. Appl. No. 12/791,447, 13 pages.

(Continued)

*Primary Examiner* — Stephen Sherman
*Assistant Examiner* — Andre Matthews
(74) *Attorney, Agent, or Firm* — Morgan, Lewis & Bockius LLP

(57) ABSTRACT

Techniques are described herein to assist users to operate non-physical controls in situations where the users are unable to visually locate the controls. According to one embodiment, the device containing the non-physical controls is designed to give non-visual feedback to the user based, at least on part, on the distance between (a) the current position of user input, and (b) the location of the non-physical control. At least one characteristic of the non-visual feedback changes as that distance changes.

22 Claims, 3 Drawing Sheets

(56) References Cited

OTHER PUBLICATIONS

Final Office Action, dated Aug. 8, 2013, received in U.S. Appl. No. 12/791,447, 16 pages.
Office Action, dated Jan. 16, 2014, received in U.S. Appl. No. 12/791,447, 13 pages.
Final Office Action, dated Aug. 4, 2014, received in U.S. Appl. No. 12/791,447, 12 pages.
Office Action, dated Feb. 12, 2015, received in U.S. Appl. No. 12/791,447, 16 pages.
Final Office Action, dated Oct. 22, 2015, received in U.S. Appl. No. 12/791,447, 18 pages.
Notice of Allowance, dated Feb. 26, 2016, received in U.S. Appl. No. 12/791,447, 10 pages.

* cited by examiner

PROVIDING NON-VISUAL FEEDBACK FOR NON-PHYSICAL CONTROLS

RELATED APPLICATIONS

This application is a continuation of U.S. application Ser. No. 12/791,447, filed Jun. 1, 2010, which is incorporated herein by reference in its entirety.

FIELD OF THE INVENTION

The present invention relates to providing non-visual feedback to a user of a device and, in particular, providing non-visual feedback to assist the user in use of non-physical controls of the device.

BACKGROUND

Devices are typically operated by controls. Controls may be physical or non-physical. The location of physical controls may be detected by touch alone. For example, even when in the dark, a user can locate a light switch by feeling the wall around the location in which light switches are typically positioned. Non-physical controls, on the other hand, cannot be detected by touch alone. For example, an icon on a computer screen cannot be detected simply by running one's fingers across the computer screen. In this example, the icon cannot be physically detected because the screen location of the icon feels no different to the touch than the rest of the screen.

Users typically rely on sight to locate non-physical controls. For example, to select an icon that is displayed on a touch screen, a user would typically look at the screen to locate the icon, and then use visual feedback to guide the user's finger to that location.

When users are not able to easily see the non-physical controls of a device, it may become difficult or impossible for them to operate the device. A variety of circumstances may lead to situations in which users are not able to see non-physical controls of a device. For example, some users may be visually impaired. As another example, lighting may be insufficient. As yet another example, some devices may not be able to generate visual depictions of non-physical controls, either because the devices or broken, or because they are not designed with that functionality.

Even when conditions exist that would otherwise allow a user to see a non-physical control, the user may have reasons for not looking at the device. For example, a user that is watching a movie or driving a vehicle may want their vision to remain focused elsewhere, rather than looking for the location of a non-physical control of a device. Similarly, a user may want to operate a device while keeping the device in his or her pocket.

Based on the foregoing, it is clearly desirable to help users operate non-physical controls when the users either cannot or do not want to use their vision to locate the non-physical controls.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
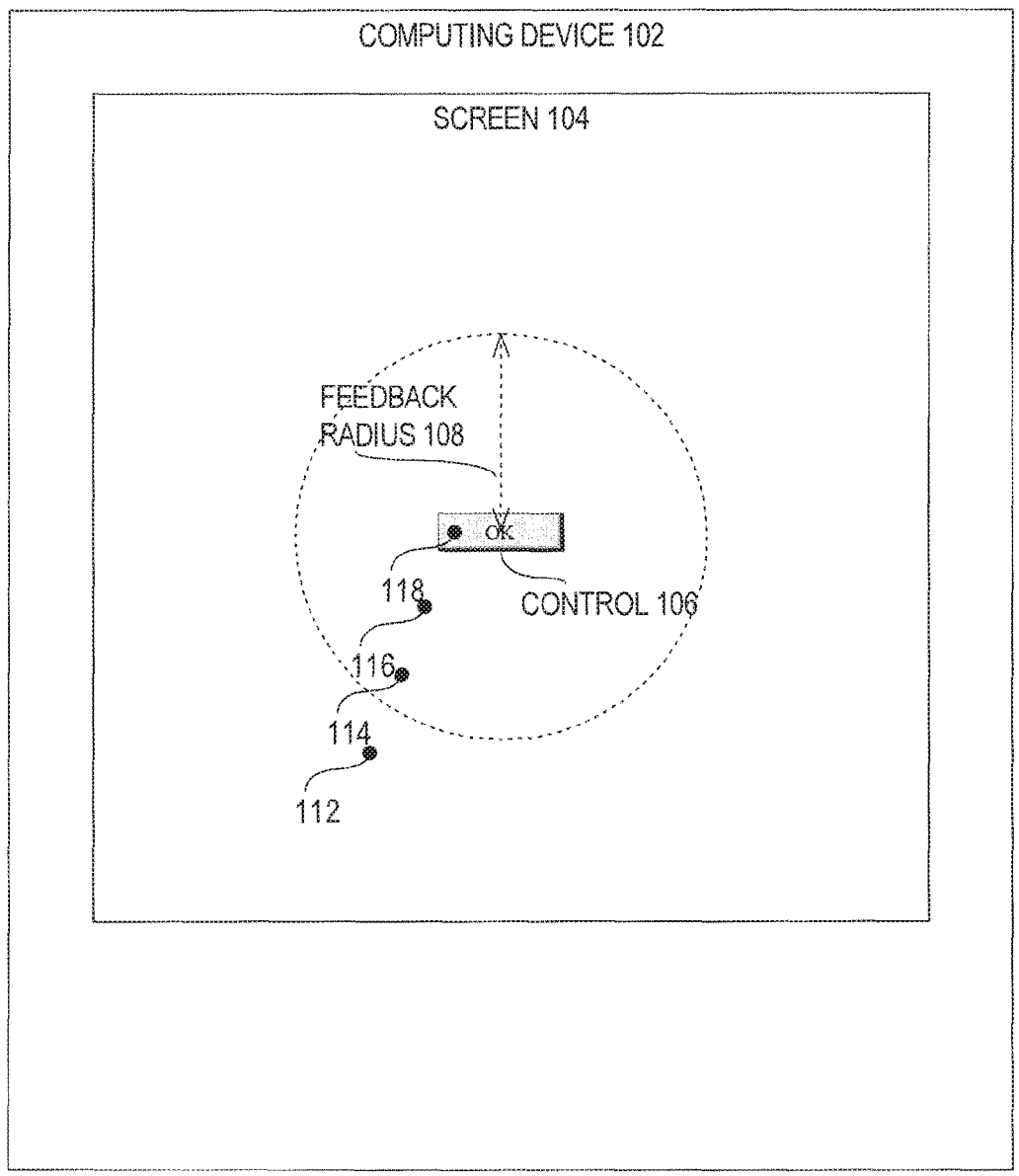
FIG. 1 is a block diagram of a device designed to give non-visual feedback to assist in user selection of non-physical controls, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein to assist users to operate non-physical controls in situations where the users are unable to visually locate the controls. According to one embodiment, the device containing the non-physical controls is designed to give non-visual feedback to the user based, at least on part, on the distance between (a) the current position of user input, and (b) the location of the non-physical control. At least one characteristic of the non-visual feedback changes as that distance changes.

For example, in one embodiment, the feedback is audio feedback, and the characteristic is volume. In such an embodiment, the volume of a tone emitted by the device may increase the closer the user input gets to the location of the non-physical control. Conversely, the volume of the tone would decrease as the user input moves away from the location of the non-physical control.

According to one embodiment, when the user input is sufficiently close to the control for the user to operate the control, that fact is reflected in the non-visual feedback that is generated by the device. For example, the device may generate a "beep" and cease to emit the tone when a user's finger touches an icon. At that point, the user may operate the control as desired.

Audio feedback is merely one example of non-visual feedback that may be used by the device to assist the user in locating non-physical controls of the device. Instead of or in addition to audio feedback, the device may provide tactile feedback. For example, a device that has a vibrator may vibrate to help the user locate a non-physical control, where the intensity of the vibration is based on the distance between the current location of user input and the location of the non-physical control.

Devices with Non-Physical Controls

There are many types of devices that have non-physical controls, and the techniques described herein are not limited to any particular type of device. For example, the techniques may be used with a personal digital assistant that has a touch screen operated by a user's finger. In this example, the location of the user input would be the point at which the finger is touching the screen. Alternately, the device may be a desktop computer, and the user input may be through operation of a mouse. In this example, the location of the user input would the location of the pointer that is being controlled by the mouse.

The techniques described herein are also not limited to any particular type of user input mechanism. For example, the techniques may be used by devices that receive touch input, track-ball input, mouse input, light-pen input, stylus input, etc. The techniques may also be used with devices that do not display any visual representation of their non-physical controls. For example, a device may have a large track pad with no screen, where the non-physical controls are "located" but not displayed at particular locations on the track pad.

Example Device

Referring to FIG. 1, it is a block diagram of a device that is configured to generate non-visual feedback to assist a user in locating a non-physical control. In the example illustrated in FIG. 1, the device is a computing device 102 with a screen 104 that is displaying a control 106. For the purpose of explanation, it shall be assumed that computing device 102 receives user input by a user touching the screen 104 with a finger.

Feedback radius 108 is the radius of a circle that is centered on control 106. If the current location of user input is within the circle defined by feedback radius 108, then computing device generates non-visual feedback to indicate that the current location of user input is near control 106. For the purpose of illustration, it shall be assumed that the non-visual feedback is a sound. Under these circumstances, computing device 102 would generate a sound when the current location of user input is at any of points 114 and 116, and would not generate a sound when the current location of user input is at point 112.

While the current location of user input is within the circle defined by feedback radius 108, computing device 102 varies a characteristic of the non-visual feedback based on the distance between (a) the current point of user input and (b) the location of control 106. For the purpose of explanation, it shall be assumed that computing device 102 is designed to vary the volume of the sound based on the distance between the current location of user input and the location of control 106. In an embodiment that increases volume as the distance between the current location of user input and the location of control 106 decreases, computing device 102 will generate a relatively louder sound when the user input is at point 116 than when the user input is at point 114.

According to one embodiment, the non-visual feedback is altered when the current location of user input is sufficiently close to the control to allow user activation of the control. The region within which a user is able to active a control is referred to herein as the "activation zone" for the control.

For example, assume that computing device 102 is designed to allow a user to activate control 106 when the current location of user input is over control 106. That is, the activation zone of control 106 is the region of screen 104 in which control 106 is displayed. Under these circumstances, moving the current location of user input from point 116 to point 118 will cause an alteration in the non-visual feedback.

The type of non-visual feedback generated by computing device 102 in response to the current location of user input entering the activation zone may vary from implementation to implementation. For example, in one embodiment, computing device 102 may cease to generate a sound, and instead emit a single "ding". Alternatively, computing device 102 may continue to generate the sound, but begin to vibrate when the user input enters the activation zone. These are merely two examples of a virtually unlimited number of ways in which computing device 102 may communicate to a user, using non-visual feedback, that the current location of user input is within the activation zone of a control.

Overlap Zones

Figure 2:
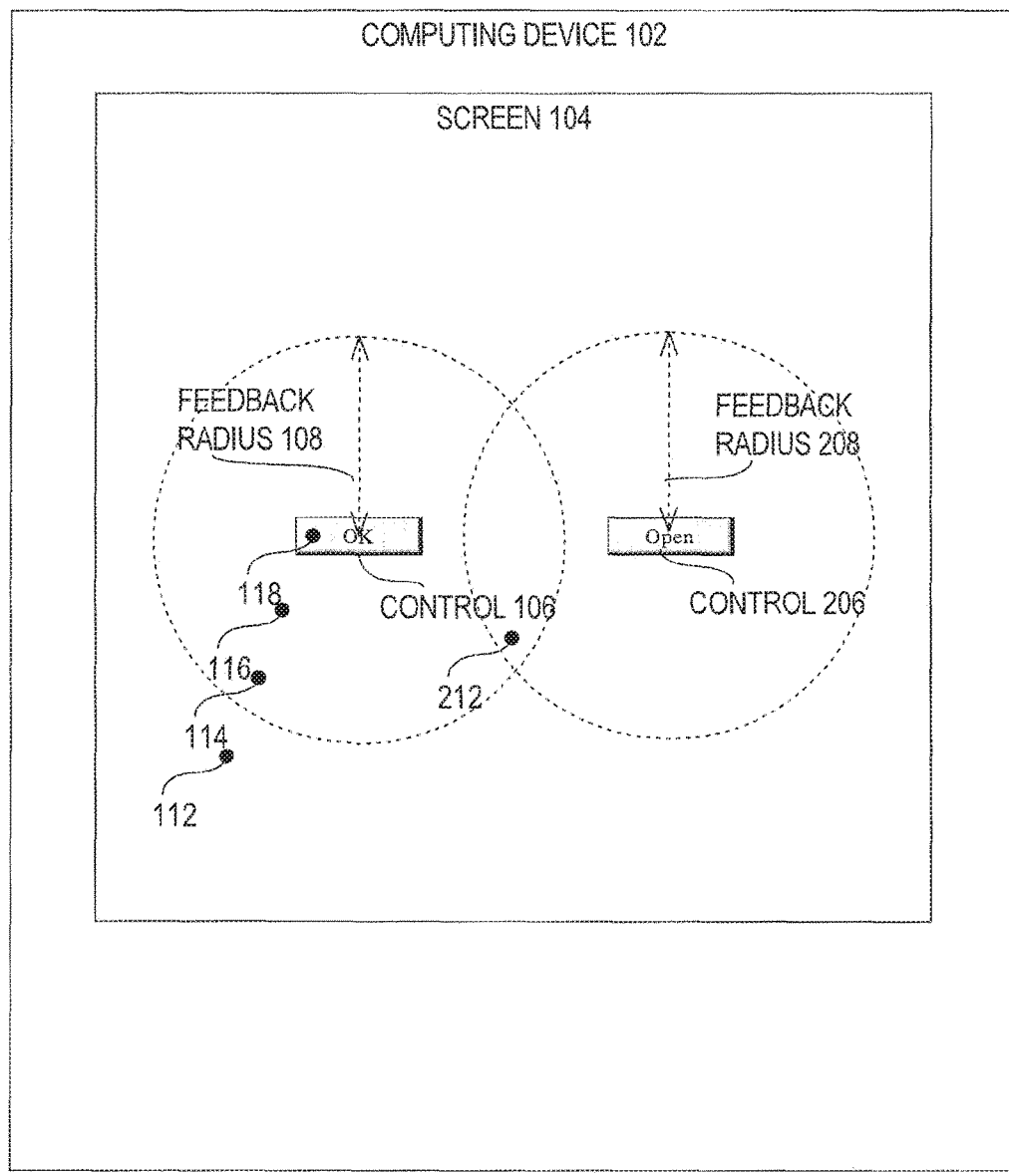
FIG. 2 is a block diagram of the device illustrated in FIG. 1, with two non-physical controls and an overlap zone.

Referring to FIG. 2, it is a block diagram of the computing device 102 illustrated in FIG. 1. However, in FIG. 2, computing device 102 is generating two non-physical controls 106 and 206. Each non-physical control has a corresponding feedback radius 108 and 208. In the example illustrated in FIG. 2, the feedback radius 108 of control 106 is the same length as the feedback radius 208 of control 206. However, in alternative embodiments, different controls may have different feedback radius lengths. In such an embodiment, the feedback radius lengths may vary, for example, based on the frequency at which the respective controls are used or expected to be used.

When computing device 102 is generating multiple controls that have their own feedback radius, it is possible for there to be zones in which the circles defined by those feedback radii overlap. For example, point 212 is within an overlap zone that is within the feedback radii of both control 106 and control 206.

According to one embodiment, computing device 102 provides non-visual feedback to indicate to a user that the current location of user input is within an overlap zone. For example, when the user's finder is touching point 212, computing device 102 may audibly inform the user that "Okay button to the left. Open button to the right". Alternatively, computing device 102 may generate different tones for each of the controls 106 and 206, and generate both tones concurrently when the current location is at point 212. These are merely two examples of non-visual feedback that computing device 102 may use to indicate to a user that the user is within an overlap zone.

Outside Feedback Zones

Referring again to FIG. 2, point 112 is not within the feedback radius of any control. According to one embodiment, rather than generate no non-visual feedback when the current location of user input is at point 112, computing device 102 may generate non-visual feedback to communicate which controls are currently being displayed on screen 104, and where those controls are generally located. For example, in response to detecting that the user is touching point 112, computing device 102 may audibly indicate "Okay button is at the left middle, and Open button is at the right middle".

This type of feedback may be particularly helpful when computing device 102 is concurrently generating many controls. For example, computing device 102 may generate four controls, one in each corner of screen 104. Under these circumstances, when the user touches an outside feedback zone, computing device 102 may audibly indicate which control is in the upper left, which control is in the upper right, which control is in the lower left, and which control is in the lower right.

Visual Mode and Non-Visual Mode

When a user interacts with a user interface of a device, the user's interactions trigger events within the computing device. The events supported by computing devices often include a touch down event, which is triggered when a user begins entering user input, and a touch up event, which is triggered when a user ceases to enter user input. For example, on a device with a touch screen, a touch down event occurs when a user first puts a finger on the touch screen, and a touch up event occurs when the user lifts the finger off the touch screen. As another example, on a device that receives mouse input, a touch down event occurs when the user pushes a button on the mouse, and a touch up event occurs when the user ceases to push the button on the mouse.

According to one embodiment, a computing device has selectable modes of user input, including a "visual mode" and a "non-visual mode". In the visual mode, it is assumed that the user is able to see non-physical controls that are displayed by the device. Because users can see the non-physical controls, users should be able to direct their initial input to the control with which they want to interact. Thus, in visual mode, the devise is configured to trigger certain actions in response to touch down events.

On the other hand, in the non-visual mode, it is assumed that the user is unable to see the non-physical controls, which may or may not actually be displayed. In non-visual mode, touch down events do not trigger the same actions that the touch down events would trigger if the device were in visual mode. Those actions are not triggered because, without the ability to see the non-physical controls, the users may initiate user input over the wrong control. According to one embodiment, in the non-visual mode, touch down events cause the device to determine what type of non-visual feedback to generate. For example, if the touch down event is on a control, then the device may audibly identify the control. If the touch down event is within an overlap zone, then the device may audibly identify the controls associated with the overlap zone, and which direction each of the controls is relative to the current location of user input. If the touch down event is within the feedback radius of a single control, then the device determines the distance between the control and the current location of user input, and generates non-visual feedback that has a characteristic that reflects that distance.

According to one embodiment, touch up events in non-visual mode trigger the same actions as touch down events in visual mode. For example, if touching an icon in visual mode causes an application to execute, then lifting a finger off of the icon in non-visual mode may cause the application to execute. In alternative embodiments, the actions triggered by touch down events in visual mode may be mapped to other types of events in non-visual mode. For example, rather triggering a particular action by double-clicking on a control, the particular action may be triggered in non-visual mode by a touch up event immediately followed by a single click. These are merely examples of the various ways in which the event-to-action mapping may be changed between the visual and non-visual modes of user input.

Non-Visual Feedback

As mentioned above, techniques are provided for giving non-visual feedback that has a characteristic reflects the distance between the current location of user input and the location of a non-physical control. As a user moves the user input location, the characteristic of the non-visual feedback will change accordingly, thereby communicating to the user whether the user is getting closer to or further away from the location of the non-physical control.

There is virtually no limit to the type of non-visual feedback that a computing device may generate, and the characteristics that may be varied to reflect the "current-distance-to-control". In the examples given above, the non-visual feedback was a sound, and the varied characteristic was volume. However, when the non-visual feedback is sound, the varied characteristic may be, for example: frequency of beeps, tone, timbre, the speed at which audio is played, etc. Likewise, when tactile feedback is used, the varied characteristics may include the magnitude of vibration of the device, the temperature of the device, the amount of electrical "shock" generated by the device, or any other tactile characteristic that the device is able to control.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
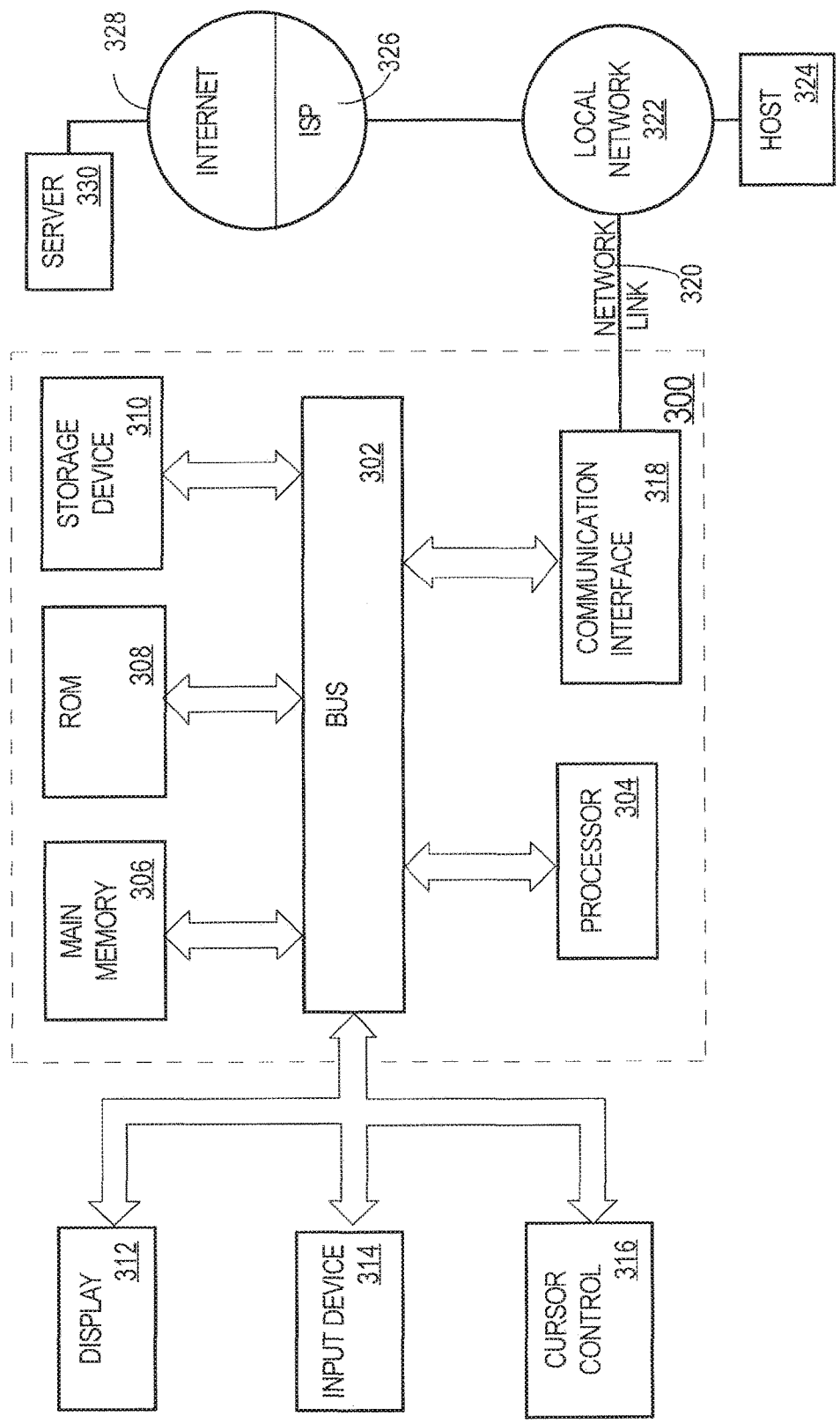
FIG. 3 is a block diagram of a computing device upon which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method, comprising:
   at a device with a touch-sensitive display and one or more output devices for generating non-visual outputs:
      displaying, on the touch-sensitive display, a selectable user interface object;
      while displaying the selectable user interface object on the touch-sensitive display, detecting an input comprising a contact at a location on the touch-sensitive display that is outside of an activation zone for the selectable user interface object and movement of the contact on the touch-sensitive display;
      in response to detecting movement of the contact to a respective location on the touch-sensitive display, generating non-visual output that is indicative of the movement of the contact to the respective location:
         in accordance with a determination that the movement of the contact to the respective location on the touch-sensitive display includes movement of the contact into the activation zone of the selectable user interface object, providing a first non-visual output that is indicative of movement of the contact on the touch-sensitive display from outside the activation zone into the activation zone, wherein the first non-visual output is a tactile output;
         in accordance with a determination that the movement of the contact to the respective location on the touch-sensitive display includes movement of the contact outside of the activation zone and does not include movement of the contact into the activation zone of the selectable user interface object, generating a second non-visual output that indicates the location of the activation zone without providing the first non-visual output that is indicative of movement of the contact into the activation zone, wherein the second non-visual output ceases in accordance with a determination that the movement of the contact is from outside the activation zone into the activation zone;

after generating the non-visual output that is indicative of the movement of the contact to the respective location:

detecting liftoff of the contact from the touch-sensitive display followed by a tap input on the touch-sensitive display at the respective location; and in response to detecting the tap input on the touch-sensitive display at the respective location:

in accordance with a determination that the respective location is within the activation zone, performing an operation associated with the activation zone; and in accordance with a determination that the respective location is outside of the activation zone, forgoing performing the operation associated with the activation zone.

2. The method of claim 1, wherein the second non-visual output is audible feedback.

3. The method of claim 1, wherein the second non-visual output is generated in accordance with a determination that the movement of the contact to the respective location on the touch-sensitive display includes movement of the contact outside of the activation zone but within a predefined feedback radius of the activation zone.

4. The method of claim 1, wherein the second non-visual output changes continuously to indicate a movement toward the activation zone in accordance with a determination that the location of the contact is moving toward the activation zone.

5. The method of claim 1, wherein the second non-visual output changes continuously to indicate a movement away from the activation zone in accordance with a determination that the location of the contact is moving away from the activation zone.

6. The method of claim 1, wherein the user interface object is selected in accordance with a determination that the liftoff is detected within the activation zone.

7. The method of claim 6, wherein the user interface object is not selected in accordance with a determination that the liftoff is detected outside the activation zone.

8. The method of claim 1, wherein the determination that the movement of the contact to the respective location on the touch-sensitive display includes movement of the contact outside of the activation zone includes a determination that the movement of the contact is inside a feedback zone; and the method further comprises:

in accordance with a determination that the movement of the contact to the respective location on the touch-sensitive display includes movement of the contact outside of the feedback zone and outside of the activation zone and does not include movement of the contact into the activation zone of the selectable user interface object, generating a third non-visual output that indicates the location of the activation zone without providing the first non-visual output or the second non-visual output.

9. A non-transitory computer-readable storage medium storing instructions which, when executed by one or more processors of an electronic device with a touch-sensitive display and one or more output devices for generating non-visual output, cause the electronic device to perform operations comprising:

displaying, on the touch-sensitive display, a selectable user interface object;

while displaying the selectable user interface object on the touch-sensitive display, detecting an input comprising a contact at a location on the touch-sensitive display that is outside of an activation zone for the selectable user interface object and movement of the contact on the touch-sensitive display;

in response to detecting movement of the contact to a respective location on the touch-sensitive display, generating non-visual output that is indicative of the movement of the contact to the respective location:

in accordance with a determination that the movement of the contact to the respective location on the touch-sensitive display includes movement of the contact into the activation zone of the selectable user interface object, providing a first non-visual output that is indicative of movement of the contact on the touch-sensitive display from outside the activation zone into the activation zone, wherein the first non-visual output is a tactile output;

in accordance with a determination that the movement of the contact to the respective location on the touch-sensitive display includes movement of the contact outside of the activation zone and does not include movement of the contact into the activation zone of the selectable user interface object, generating a second non-visual output that indicates the location of the activation zone without providing the first non-visual output that is indicative of movement of the contact into the activation zone;

wherein the second non-visual output ceases in accordance with a determination that the movement of the contact is from outside the activation zone into the activation zone;

after generating the non-visual output that is indicative of the movement of the contact to the respective location:

detecting liftoff of the contact from the touch-sensitive display followed by a tap input on the touch-sensitive display at the respective location; and in response to detecting the tap input on the touch-sensitive display at the respective location:

in accordance with a determination that the respective location is within the activation zone, performing an operation associated with the activation zone; and in accordance with a determination that the respective location is outside of the activation zone, forgoing performing the operation associated with the activation zone.

10. The non-transitory computer-readable storage medium of claim 9, wherein the second non-visual output is audible feedback.

11. The non-transitory computer-readable storage medium of claim 9, wherein the second non-visual output is generated in accordance with a determination that the movement of the contact to the respective location on the touch-sensitive display includes movement of the contact outside of the activation zone but within a predefined feedback radius of the activation zone.

12. The non-transitory computer-readable storage medium of claim 9, wherein the second non-visual output changes continuously to indicate a movement toward the activation zone in accordance with a determination that the location of the contact is moving toward the activation zone.

13. The non-transitory computer-readable storage medium of claim 9, wherein the second non-visual output changes continuously to indicate a movement away from the activation zone in accordance with a determination that the location of the contact is moving away from the activation zone.

14. The non-transitory computer-readable storage medium of claim 9, wherein the user interface object is selected in accordance with a determination that the liftoff is detected within the activation zone.

15. The non-transitory computer-readable storage medium of claim 14, wherein the user interface object is not selected in accordance with a determination that the liftoff is detected outside the activation zone.

16. A computing device, comprising:
   one or more processors;
   a touch-sensitive display;
   one or more output devices for generating non-visual output; and
   memory storing instructions, which, when executed by the one or more processors, cause the computing device to perform operations including:
   displaying, on the touch-sensitive display, a selectable user interface object;
      while displaying the selectable user interface object on the touch-sensitive display, detecting an input comprising a contact at a location on the touch-sensitive display that is outside of an activation zone for the selectable user interface object and movement of the contact on the touch-sensitive display;
      in response to detecting movement of the contact to a respective location on the touch-sensitive display, generating non-visual output that is indicative of the movement of the contact to the respective location:
         in accordance with a determination that the movement of the contact to the respective location on the touch-sensitive display includes movement of the contact into the activation zone of the selectable user interface object, providing a first non-visual output that is indicative of movement of the contact on the touch-sensitive display from outside the activation zone into the activation zone, wherein the first non-visual output is a tactile output;
         in accordance with a determination that the movement of the contact to the respective location on the touch-sensitive display includes movement of the contact outside of the activation zone without moving and does not include movement of the contact into the activation zone of the selectable user interface object, generating a second non-visual output that indicates the location of the activation zone without providing the first non-visual output that is indicative of movement of the contact into the activation zone,
         wherein the second non-visual output ceases in accordance with a determination that the movement of the contact is from outside the activation zone into the activation zone;
      after generating the non-visual output that is indicative of the movement of the contact to the respective location:
         detecting liftoff of the contact from the touch-sensitive display followed by a tap input on the touch-sensitive display at the respective location; and
         in response to detecting the tap input on the touch-sensitive display at the respective location:
            in accordance with a determination that the respective location is within the activation zone, performing an operation associated with the activation zone; and
            in accordance with a determination that the respective location is outside of the activation zone, forgoing performing the operation associated with the activation zone.

17. The computing device of claim 16, wherein the second non-visual output is audible feedback.

18. The computing device of claim 16, wherein the second non-visual output is generated in accordance with a determination that the movement of the contact to the respective location on the touch-sensitive display includes movement of the contact outside of the activation zone but within a predefined feedback radius of the activation zone.

19. The computing device of claim 16, wherein the second non-visual output changes continuously to indicate a movement toward the activation zone in accordance with a determination that the location of the contact is moving toward the activation zone.

20. The computing device of claim 16, wherein the second non-visual output changes continuously to indicate a movement away from the activation zone in accordance with a determination that the location of the contact is moving away from the activation zone.

21. The computing device of claim 16, wherein the user interface object is selected in accordance with a determination that the liftoff is detected within the activation zone.

22. The computing device of claim 21, wherein the user interface object is not selected in accordance with a determination that the liftoff is detected outside the activation zone.

* * * * *